US 8,327,109 B2

(12) United States Patent
Caspole

(10) Patent No.: US 8,327,109 B2
(45) Date of Patent: Dec. 4, 2012

(54) GPU SUPPORT FOR GARBAGE COLLECTION

(75) Inventor: Eric R Caspole, Menlo Park, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 337 days.

(21) Appl. No.: 12/715,835

(22) Filed: Mar. 2, 2010

(65) Prior Publication Data
US 2011/0219204 A1    Sep. 8, 2011

(51) Int. Cl.
*G06F 12/00* (2006.01)
(52) U.S. Cl. ........ 711/173; 711/100; 711/101; 711/102; 711/147; 711/148; 711/149; 711/161; 711/162; 707/692; 707/693; 707/814; 707/815; 707/816; 707/817; 707/818; 707/819; 707/820
(58) Field of Classification Search .......... 711/101–121, 711/147–161; 707/692–693, 814–820
See application file for complete search history.

(56) References Cited

U.S. PATENT DOCUMENTS

| 4,775,932 | A |   | 10/1988 | Oxley et al. |
|---|---|---|---|---|
| 4,989,134 | A |   | 1/1991 | Shaw |
| 5,136,706 | A |   | 8/1992 | Courts |
| 5,355,483 | A | * | 10/1994 | Serlet ........................... 711/154 |
| 5,530,850 | A |   | 6/1996 | Ford et al. |
| 5,551,003 | A |   | 8/1996 | Mattson et al. |
| 5,560,003 | A |   | 9/1996 | Nilson et al. |
| 5,561,786 | A |   | 10/1996 | Morse |
| 5,652,883 | A |   | 7/1997 | Adcock |
| 5,687,368 | A |   | 11/1997 | Nilsen |
| 5,751,613 | A |   | 5/1998 | Doty et al. |
| 6,081,665 | A |   | 6/2000 | Nilsen et al. |
| 6,199,075 | B1 |   | 3/2001 | Ungar et al. |
| 6,300,962 | B1 |   | 10/2001 | Wishoff et al. |

(Continued)

FOREIGN PATENT DOCUMENTS
WO    WO2010034035    11/2007

OTHER PUBLICATIONS

Wilson, Paul R., "Uniprocessor Garbage Collection Techniques," Technical Report, The University of Texas, Jan. 1994.

(Continued)

*Primary Examiner* — Tuan Thai
*Assistant Examiner* — Zhuo Li
(74) *Attorney, Agent, or Firm* — Rory D. Rankin; Meyertons, Hood, Kivlin, Kowert & Goetzel, PC

(57) ABSTRACT

A system and method for efficient garbage collection. A general-purpose central processing unit (CPU) partitions an allocated heap according to a generational garbage collection technique. The generations are partitioned into fixed size cards. The CPU marks indications of qualified dirty cards during application execution since the last garbage collection. When the CPU detects a next garbage collection start condition is satisfied, the CPU sends a notification to a special processing unit (SPU) corresponding to a determination of one or more card root addresses, each card root address corresponding to one of said marked indications. The SPU has a single instruction multiple data (SIMD) parallel architecture and may be a graphics processing unit (GPU). The SPU may utilize the parallel architecture of its SIMD core to simultaneously compute multiple card root addresses. Following, the SPU sends these addresses to the CPU to be used in a garbage collection algorithm.

14 Claims, 8 Drawing Sheets

U.S. PATENT DOCUMENTS

| | | | |
|---|---|---|---|
| 6,470,361 B1 | 10/2002 | Alpern et al. | |
| 6,526,422 B1 | 2/2003 | Flood et al. | |
| 6,560,619 B1 | 5/2003 | Flood et al. | |
| 6,760,815 B1 | 7/2004 | Traversat et al. | |
| 6,763,440 B1 | 7/2004 | Traversat | |
| 6,804,762 B1 | 10/2004 | Dussud et al. | |
| 6,823,351 B1 | 11/2004 | Flood et al. | |
| 6,826,583 B1 | 11/2004 | Flood et al. | |
| 6,839,725 B2 | 1/2005 | Agesen et al. | |
| 6,865,585 B1 | 3/2005 | Dussud | |
| 6,868,488 B2 | 3/2005 | Garthwaite | |
| 6,901,587 B2 | 5/2005 | Kramskoy et al. | |
| 6,931,423 B2 | 8/2005 | Sexton et al. | |
| 6,996,590 B2 | 2/2006 | Borman | |
| 7,010,555 B2 | 3/2006 | Blandy et al. | |
| 7,016,923 B2 | 3/2006 | Garthwaite | |
| 7,017,162 B2 | 3/2006 | Smith et al. | |
| 7,024,436 B2 | 4/2006 | Kolodner et al. | |
| 7,031,990 B2 | 4/2006 | Garthwaite | |
| 7,051,056 B2 | 5/2006 | Rodriguez-Rivera | |
| 7,065,617 B2 | 6/2006 | Wang | |
| 7,069,280 B2 | 6/2006 | Garthwaite | |
| 7,408,782 B2 | 8/2008 | Austin et al. | |
| 7,412,466 B1 | 8/2008 | Garthwaite | |
| 2004/0039759 A1 | 2/2004 | Detlefs et al. | |
| 2004/0078381 A1 | 4/2004 | Blandy et al. | |
| 2004/0111445 A1 | 6/2004 | Garthwaite et al. | |
| 2004/0111718 A1 | 6/2004 | Detlefs | |
| 2004/0128329 A1 | 7/2004 | Ben-Yitzhak et al. | |
| 2004/0133759 A1 | 7/2004 | Sekiguchi | |
| 2004/0162860 A1 | 8/2004 | Detlefs | |
| 2004/0162861 A1 | 8/2004 | Detlefs | |
| 2004/0199742 A1* | 10/2004 | Wang | 711/170 |
| 2005/0114844 A1 | 5/2005 | Betancourt et al. | |
| 2005/0132374 A1 | 6/2005 | Flood et al. | |
| 2005/0149686 A1 | 7/2005 | Bacon et al. | |
| 2005/0166028 A1 | 7/2005 | Chung et al. | |
| 2005/0198079 A1 | 9/2005 | Heeb | |
| 2005/0235120 A1 | 10/2005 | Dussud | |
| 2005/0240943 A1 | 10/2005 | Smith et al. | |
| 2005/0273567 A1 | 12/2005 | Blandy | |
| 2005/0278497 A1 | 12/2005 | Pliss et al. | |
| 2006/0020745 A1* | 1/2006 | Conley et al. | 711/103 |
| 2006/0059453 A1 | 3/2006 | Kuck et al. | |
| 2006/0092161 A1 | 5/2006 | Meeker | |
| 2007/0255909 A1* | 11/2007 | Gschwind et al. | 711/147 |
| 2008/0162611 A1 | 7/2008 | Wolczko et al. | |

OTHER PUBLICATIONS

Hudson, et al., "Incremental Collection of Mature Objects," Proceedings of the Int'l Workshop on Memory Management, 1992, 16 pages.

Printezis, et al. "A Generational Mostly-Concurrent Garbage Collector," 1998, 12 pages.

Lieberman, et al., "A Real-Time Garbage Collector Based on the Lifetimes of Objects," Communications of the ACM, Jun. 1983, vol. 26, No. 6, pp. 419-429.

Detlefs, et al., "Garbage-First Garbage Collection," Sun Microsystems, Inc., 2004, pp. 37-48.

Bacon, et al., "The Metronome: A Simpler Approach to Garbage Collection in Real-Time Systems," Springer-Verlag Berlin Heidelberg 2003, pp. 466-478.

Sachindran, et al., "Mark-Copy: Fast Copying GC with Less Space Overhead," ACM, 2003, 18 pages.

Hallenberg, et al., "Combining Region Inference and Garbage Collection", PLDI '02, Jun. 17-19, 2002, Berlin, Germany.

"Garbage Collection"; Sep. 27, 2004; 7 pages; printed off website www.memorymanagement.org.

Abuaiadh, et al; "An Efficient Parallel Heap Compaction Algorithm"; OOPSLA'04; Oct. 24-28, 2004; pp. 224-236; Vancouver, British Columbia, Canada.

Agesen, et al; "An Efficient Meta-Lock for Implementing Ubiquitous Synchronization"; Sun Microsystems; Apr. 1999; pp. 1-27; SMLI TR-99-76; Palo Alto, CA; USA.

Agesen, et al; "Mixed-mode Bytecode Execution"; Sun Microsystems; Jun. 2000; pp. 1-20; SMLI TR-2000-87; Palo Alto, CA; USA.

Agesen; "GC Points in a Threaded Environment"; Sun Microsystems; Dec. 1998; pp. 1-20; SMLI TR-98-70; Palo Alto, CA; USA.

Ben-Yitzhak, et al; "An Algorithm for Parallel Incremental Compaction"; IBM Haifa Research Laboratory, Mount Carmel; Jun. 20-21, 2002; pp. 100-105; Berlin, Germany.

Appel; "Simple Generational Garbage Collection and Fast Allocation"; Department of Computer Science—Princeton Universtiy; Mar. 1998; 16 pages; Princeton, N.J., USA.

Flood, et al; "Parallel Garbage Collection for Shared Memory Multiprocessors"; Sun Microsystems; Apr. 2001; USA.

Martin Larose and Marc Freeley, A Compacting Incremental Collector and its Performance in a Production Quality Compiler, Oct. 1998, Proceedings of the 1st International Symposium on Memory Management ISMM '98, vol. 34, Issue 3.

"Applying Priorities to Memory Allocation"; Robertz, et al.; ISMM'02, Jun. 20-21, 2002.

"Efficient Garbage Collection Schemes for Casual Message Logging with Independent Checkpointing"; Ahn, et al.; The Journal of Super Computing; pp. 175-196; 2002.

A "Card-Marking" Scheme for Controlling Intergenerational References in Generation-Based Garbage Collection on Stock Hardware; [Working Paper]; Paul Wilson and Thomas G. Moher; Electrical Engineering and Computer Science Dept.; University of Illinois at Chicago; Chicago, Ill.; pp. 87-92; 1989.

"Java Theory and Practice: Garbage Collection in the HotSpot JVM"; Goetz, Brian; Quiotix Corp.; Nov. 25, 2003; developWorks; IBM.

International Search Report & Written Opinion for International Application No. PCT/US2011/025779 mailed May 26, 2011.

\* cited by examiner

GPU SUPPORT FOR GARBAGE COLLECTION

BACKGROUND OF THE INVENTION

1. Field of the Invention

This invention relates to computing systems, and more particularly, to computer garbage collection mechanisms.

2. Description of the Relevant Art

When software programmers write applications to perform work according to an algorithm or a method, the programmers often utilize variables to reference temporary and result data. This data, which may be referred to as data objects, requires that space be allocated in computer memory. During execution of one or more applications, the amount of computer memory unallocated, or free, for data object allocation may decrease to a suboptimal level. Such a reduction in the amount of free space may decrease system performance and, eventually, there may not be any free space available. Automatic memory management techniques, such as garbage collection, may be used during application execution. Garbage collection maintains sufficient free space, identifies and removes memory leaks, copies some or all of the reachable data objects into a new area of memory, updates references to data objects as needed, and so on.

Garbage collection algorithms have design tradeoffs to accompany their benefits. For example, garbage collection algorithms typically include several steps and may be relatively time consuming. Consequently, the computing system may experience a pause while the garbage collection algorithm performs its tasks. If the garbage collector is run in real-time, or concurrent with the execution of applications, the length of the garbage collection pause may be unacceptable. In addition, the algorithm may utilize cache space during its execution. The use of cache space may in turn cause the eviction of useful information that must be re-fetched once the algorithm has finished.

Performing the steps of a garbage collection algorithm on a portion of memory, rather than the entire memory reduces the pause times associated with garbage collection. In addition, studies have shown in many software applications that most data objects die young. Therefore, one solution to the problems with garbage collection described above includes executing a garbage collection algorithm on a portion of memory with the youngest data objects. One such technique is generation garbage collection.

At a time when a garbage collection is determined to be run, some pre-processing steps are performed before the garbage collection proceeds. For example, addresses of older data objects pointing to younger data objects are computed at this time. The garbage collection algorithm subsequently uses these addresses to locate all reachable data objects. As the number and size of addresses increase, the time used for the address computation increases and may reduce the benefit of the generational garbage collection technique.

In view of the above, efficient methods and mechanisms for performing computer garbage collection are desired.

SUMMARY OF EMBODIMENTS OF THE INVENTION

Systems and methods for performing efficient garbage collection are contemplated.

In one embodiment, a processing node includes a general-purpose central processing unit (CPU), a special processing unit (SPU), and a memory. In one embodiment, the SPU has a single instruction multiple data (SIMD) parallel architecture and may be a graphics processing unit (GPU). The CPU operates to divide an allocated heap within the memory into a plurality of regions. In various embodiments, the regions may be ordered or identifiable by age, and may be referred to as "generations." In addition, each region may comprise a plurality of sub-regions, or "cards." In some embodiments, each card has a fixed size, such as 128 bytes, a 4 KB virtual page, or otherwise. During application execution, the CPU marks an indication corresponding to a particular card responsive to detecting a modification of a data object stored in the card qualifies as a potential cross-generation reference. For example, in one embodiment, a pointer value stored within the data object may be modified to point to a data object stored in another generation. In another embodiment, the marking of a corresponding indication occurs when the pointer value is modified to point to a data object stored in a youngest generation. Other qualifying conditions are possible and are contemplated.

In various embodiments, the CPU may detect a garbage collection start condition is satisfied—such as the youngest generation having less free memory space than a predetermined threshold. In response to determining a garbage collection start condition is satisfied, the CPU sends a notification to the SPU which indicates the SPU is to perform predetermined garbage collection related tasks. In one embodiment, the SPU may determine one or more card root addresses, each card root address corresponding to one of the marked indications. The SPU may utilize a parallel architecture of a SIMD core to simultaneously compute multiple card root addresses. While the SPU performs the garbage collection related tasks, the CPU may continue processing of other tasks. Therefore, the card root addresses may be determined without the CPU incurring a garbage collection pause. Additionally, the cache subsystem of the CPU is not needed for these tasks. Therefore, overall system performance may be improved. In various embodiments, a CPU of a first processing node may send the above-described notification via a network connection to an SPU located in a second processing node. The SPU may then determine the card root addresses as described above in order to offload the CPU These and other embodiments will be further appreciated upon reference to the following description and drawings.

Figure 1:
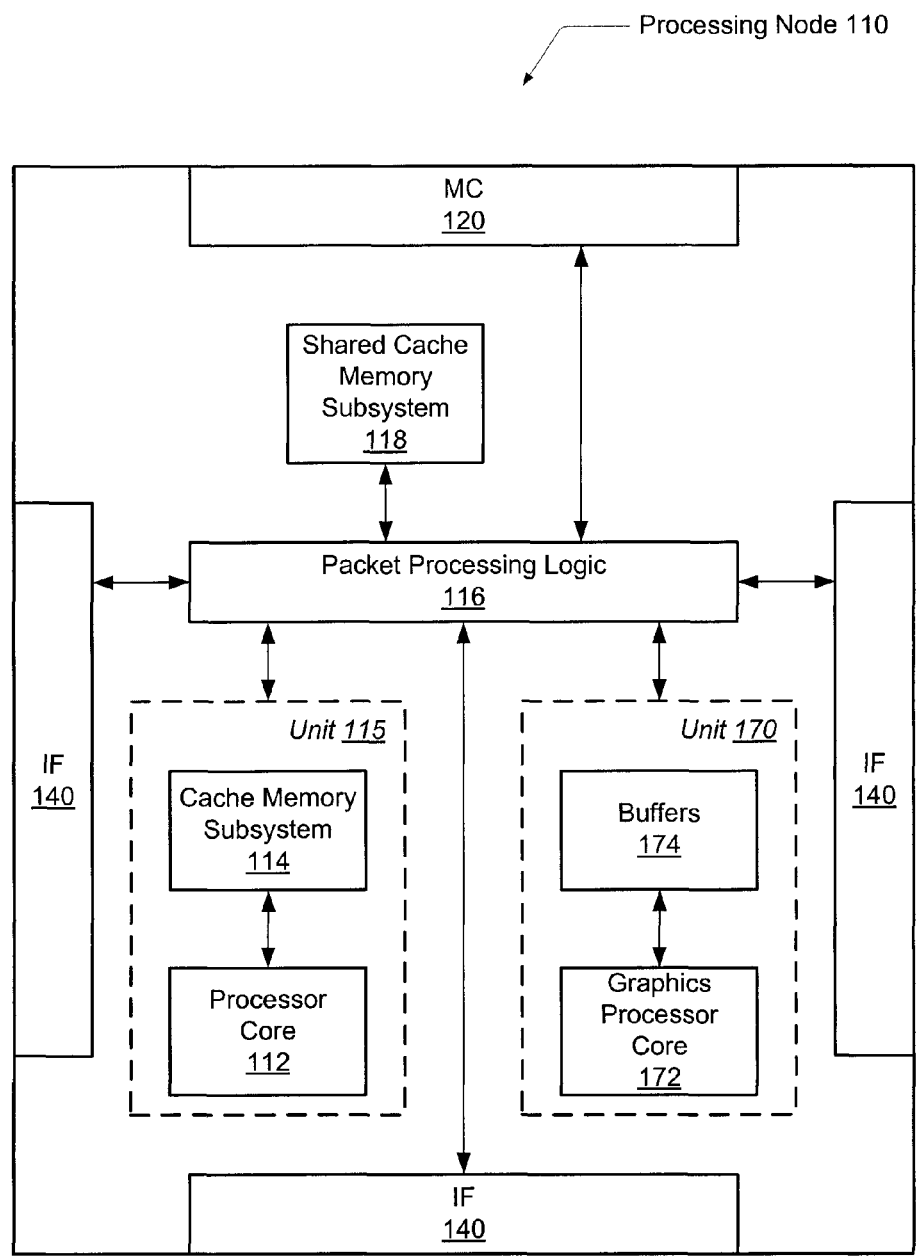
FIG. 1 is a generalized block diagram of one embodiment of an exemplary processing node with a special processing unit with a parallel architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of an exemplary processing node 110 with a special processing unit (SPU) with a parallel architecture is shown. Processing node 110 may include memory controller 120, interface logic 140, one or more processing units 115, which may include one or more processor cores 112 and a corresponding cache memory subsystems 114; packet processing logic 116, and a shared cache memory subsystem 118. In addition, processing node 110 may include one or more special processing units (SPUs) 170. The SPU 170 may comprise a special processor core 172 with a parallel architecture, such as a single instruction multiple data (SIMD) core. Examples of SIMD cores include graphics processing units (GPUs), digital signal processing (DSP) cores, or other.

In one embodiment, processing node 110 may include a SPU 170 implemented as a graphics processing units (GPU) in place of or in addition to a second general-purpose processing unit 115 (not shown). GPU 170 may include one or more graphic processor cores 172 and data storage buffers 174. A GPU may be a dedicated graphics rendering device for a personal computer, a workstation, or a video game console. In one embodiment, the illustrated functionality of processing node 110 is incorporated upon a single integrated circuit.

Processor cores 112 include circuitry for executing instructions according to a predefined general-purpose instruction set. For example, the x86 instruction set architecture may be selected. Alternatively, the Alpha, PowerPC, or any other general-purpose instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller within the node to which the missing block is mapped.

Modern GPUs 170 are very efficient at manipulating and displaying computer graphics, and their highly parallel structure makes them more effective than general-purpose central processing units (CPUs), such as processing unit 115, for a range of complex algorithms. A GPU typically executes calculations required for graphics and video and the CPU executes calculations for many more system processes than graphics alone. Conventional GPUs 170 use very wide single instruction multiple data (SIMD) architectures to achieve high throughput in image-rendering applications. Such applications generally entail executing the same programs, such as vertex shaders or pixel shaders, on large numbers of objects (vertices or pixels). Since each object is processed independently of other objects, but the same sequence of operations is used, a SIMD architecture provides considerable performance enhancement.

Developments in GPUs 170 include support for programmable shaders, which can manipulate vertices and textures, oversampling and interpolation techniques to reduce aliasing, and very high-precision color spaces. Many of these computations involve matrix and vector operations. Therefore, GPUs 119 have been considered for non-graphical calculations.

In one embodiment, in order to manage memory, the CPU executes the steps of an algorithm for generational garbage collection (GC); see H. Lieberman, et al., A Real-Time Garbage Collector Based on the Lifetime of Objects, Communications of the ACM 26 (6), 1983, pp. 419-429. The CPU 115 may utilize the pre-processing steps of a card marking technique prior to executing a generational garbage collection algorithm, see P. Wilson, et al., A card-marking scheme for controlling intergenerational references in generation-based GC on stock hardware, SIGPLAN Notices 24 (5), 1989, pp. 87-92. In order to reduce garbage collection pause times, the algorithm may be run on a portion of memory, rather than the entire memory. In one embodiment, an allocated heap in memory may be partitioned into regions. These regions may be referred to as "generations". In one embodiment, each generation corresponds to an age of the data objects comprised within. In one embodiment, the garbage collection algorithm may run on only one or more of the youngest generations. Such a technique may reduce both the garbage collection pause time and the utilization of a cache during the garbage collection.

A first data object located within the one or more younger generations may be referenced to by a second data object in an older generation. This older generation is not included within the one or more younger generations. Since the garbage collection executes only on the one or more younger generations, this referencing may be missed. If such a miss occurs, the first data object located within the younger generations may be erroneously determined to be unreachable. Data objects determined to be unreachable are removed from memory. Therefore, steps are taken to determine the addresses of any data objects located in older generations that reference data objects in the younger generations. These steps are performed as part of the generational garbage collection technique and are further described later.

In one embodiment, each generation is partitioned into sub-regions. These sub-regions may be referred to as "cards". In one embodiment, each card corresponds to an age of the data objects comprised within. In one embodiment, the garbage collection algorithm may run on each card located within the younger generations. The garbage collection may run on only marked cards within the older generations. During application execution, in one embodiment, a card may be marked when it is determined the card comprises a data object that points to another data object located within the one or more youngest generations. In another embodiment, a card may be marked when it is determined the card comprises a data object that is modified. Other conditions for marking a card are possible and contemplated. In one embodiment, a pre-processing step performed prior to executing a garbage collection algorithm is determining the addresses of marked cards. Later, in the algorithm, steps are performed to determine the addresses of any data objects located in older generations that reference data objects in the younger generations.

Referring again to FIG. 1, in one embodiment, when the CPU 115 detects a generational GC start condition, the CPU 115 may send a notification to a GPU 170. In response to receiving the notification, the GPU 170 may compute addresses. These addresses may correspond to cards in older generations potentially storing pointer values to cards in younger generations. These addresses may be referred to as root addresses or card root addresses.

The computation of the root addresses described above may be a highly parallelizable task. The GPU 170 may perform highly parallelizable tasks more efficiently than the CPU. In addition, the work performed by the GPU 170 may be performed while the CPU 115 continues execution of one or more software applications. Therefore, the execution of the computational steps used to obtain the root addresses may produce no GC pause. With an eliminated GC pause for the pre-processing steps, overall system performance may increase. Further details of the protocol between the CPU 115 and the GPU 170 for the execution of these pre-processing steps is further described below.

In one embodiment, the GPU 170 may be located on a video card. In another embodiment, the GPU 170 may be integrated on the motherboard. In yet another embodiment, the illustrated functionality of processing node 110 may be incorporated upon a single integrated circuit. In such an embodiment, the CPU 115 and the GPU 170 may be proprietary cores from different design centers. Also, the GPU 170 may now be able to directly access both local memories 114 and 118 and main memory via memory controller 120 from the processing node 110, rather than perform memory accesses off-chip via interface 140. This embodiment may lower latency for memory accesses for the GPU 170, which may translate into higher performance.

Continuing with the components of processing node 110 in FIG. 1, cache subsystems 114 and 118 may comprise high-speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches that are located nearer processor cores 112 (within the hierarchy) may be integrated into processor cores 112, if desired. In one embodiment, cache memory subsystems 114 each represent L2 cache structures, and shared cache subsystem 118 represents an L3 cache structure. Both the cache memory subsystem 114 and the shared cache memory subsystem 118 may include a cache memory coupled to a corresponding cache controller.

Generally, packet processing logic 116 is configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic 116.

Figure 2:
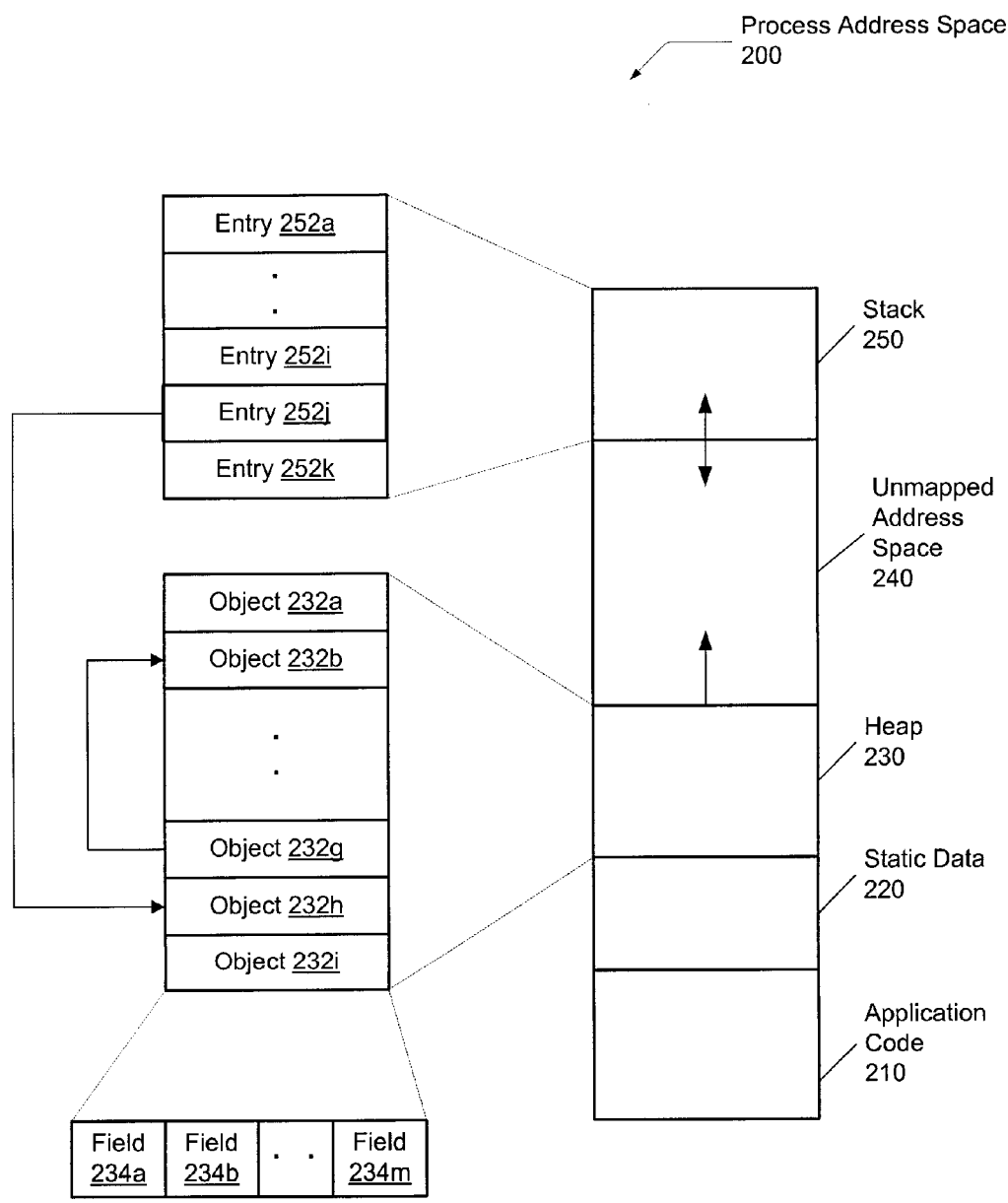
FIG. 2 is a generalized block diagram of one embodiment of a process address space.

Referring to FIG. 2, one embodiment of a generalized process address space 200 is shown. Modern computing systems use virtual memory in order to share a smaller amount of physical memory among many processes. Address space 200 may be a contiguous virtual address space, wherein a mapping between virtual addresses and physical addresses determines the location of values 210-250 in physical memory or disk. An operating system on a multi-processor system, which may, for example, reprise the resources of processing node 110, may allocate regions of memory for a software application. When a software application is compiled, the application may comprise multiple processes. In such an embodiment, each process may own its own resources such as an image of memory, or an instance of instructions and data before application execution. Also, each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Generally speaking, for a given software application, the kernel of an operating system sets up an address space 200 for the application, loads the application's code 210 into memory, sets up a stack 250 for the program, branches to a given location inside the application code 210, and begins execution of the application code 210. In some embodiments, not all code 210 and data 220 need to be stored in physical memory before execution begins. How a software application uses an instruction set architecture (ISA) is affected by the interaction of compilers and high-level languages. For example, for software application development, it needs to be known how variables are allocated and addressed and how many registers are needed to allocate variables. In one embodiment, the static data 220, stack 250, and heap 230 determine data allocation.

Static data 220 may be used to allocate statically declared objects, such as global variables and constants. A majority of these objects may be arrays. Stack 250 may be used to allocate scalar variables rather than arrays, such as local variables and parameters in the functions currently being invoked. Stack 250 may be grown and shrunk on procedure call or return, respectively. Heap 230 may be used to allocate dynamic objects accessed with pointers and are typically not scalar variables. Heap 230 may be used to reduce the frequency of copying the contents of strings and lists by storing the contents of temporary strings or lists during the string/list operations. The heap is not affected by the return of the function call.

A simple example of a method in source code that illustrates the use of the stack 250 and heap 230 follows,

```
class Students {                          /* line 1 */
    public String name;
    public int score;
}
public void Classroom ( ) {               /* line 5 */
    Students jeff = new Students( );
    jeff.name = "Jeff";
    jeff.score = 82;
}                                         /* line 9 */
```

The above example has a class called Students, and the Students class includes two public fields—name and score. The Students class is accessed by the Classroom method. Inside the Classroom method, an object named jeff is created of type Students. The object's name and score fields are initialized. In one embodiment, after executing this code example, stack 250 contains the Classroom method call in, for example, entry 252j in FIG. 2. An entry for the object jeff may be included in entry 252k in FIG. 2. The object jeff may not point to a value, but rather it may reference the object 232h in heap 230. Object 232h may store the Students object, which is a class, or reference type. Field 234a of object 232h may store the name field value and field 234b may store the score field value.

After the Classroom method has finished executing, stack 250 may pop entry 252j since this entry only contains information on code that is executing or will be executing. With nothing remaining to execute in this example, which may represent only a portion of an entire application, stack 250 may have a stack pointer adjusted to now point to entry 252i, rather than entry 252j. The heap, on the other hand, may still contain data in fields 234a and 234b of object 232h.

At a later time, a garbage collection algorithm may be executed in order to clear unreferenced (unused) data from heap 230. For example, the Students class above may be removed from object 232h because it is no longer being used. In one embodiment, a garbage collection algorithm includes one or more of following actions: scanning system memory, marking all reachable data objects (which may require recursive searches), deleting data objects determined not to be usable or reachable, and moving data objects to occupy contiguous locations in memory. This last step may be referred to as compacting.

Although not used in the above example, it is shown in FIG. 2 that object 232b is referenced by a pointer in object 232g in heap 230. When a garbage collector is executed to clear unused data, useful data remains in memory by the garbage collector algorithm. In some embodiments, the garbage collection algorithm may develop a list of data objects that need to be kept for later application use. Development of this list may begin with roots, or root addresses. Root addresses may correspond to static global pointers in static data 220, pointers in stack 250, and any data objects in heap 230 that is pointed to by a memory address in the CPU. During a recursive search by the GC algorithm, object 232g may be determined to be reachable. Object 232b may be reachable, in one example, due to being referenced by a pointer in object 232g. A reachable object may be defined as objects located by a root address or objects referenced to by an object previously determined to be reachable.

In one embodiment, a garbage collection algorithm is utilized which performs garbage collection in cycles. A cycle is started when the collector decides (or is notified) that it needs to reclaim storage. For example, garbage collection may be initiated when the system is low on memory. The garbage collection algorithm attempts to reclaim garbage, or memory used by objects that will never be accessed or mutated again by the application. A distinction may be drawn between syntactic garbage (data objects the program cannot possibly reach), and semantic garbage (data objects the program will in fact never again use). A software thread that accesses memory may be referred to as a mutator. A great variety of different garbage collection techniques have been developed and may be used.

In some cases, garbage collection systems have generally suffered to various degrees from the problem of excessive pause times. This problem arises when garbage collection is performed in real-time, i.e., concurrently with the execution of other live programs running on one or more processors. For example, suppose that a system contains multiple mutator threads and a single garbage collection thread. If the mutators are being used for a multimedia application, these threads may need to present the application, such as a movie, at a certain rate. Examples of some critical applications that cannot afford a cost of appreciable GC pause times include online stock trading, e-commerce applications, and multimedia applications such as movies and video games.

Figure 3:
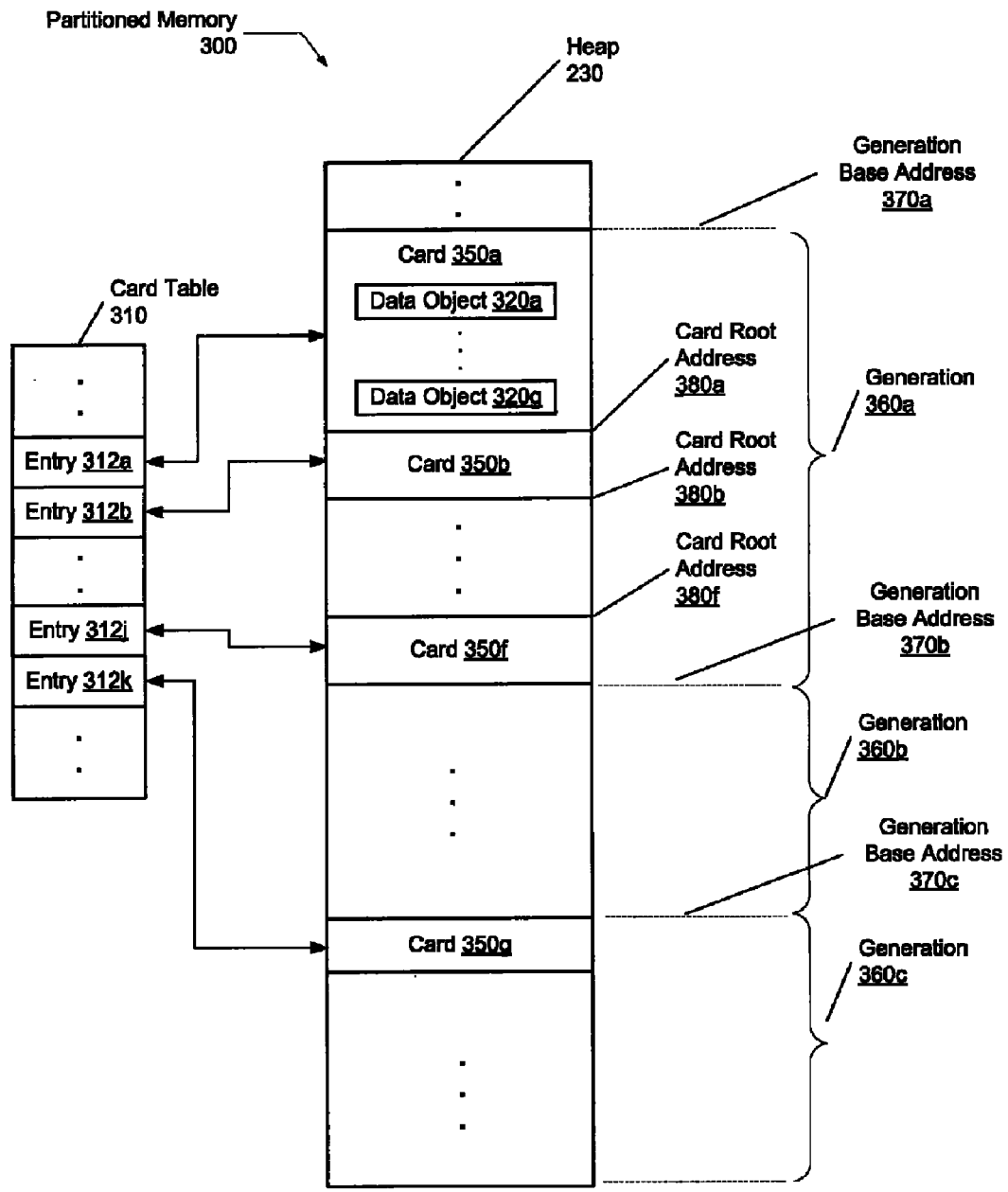
FIG. 3 is a generalized block diagram of one embodiment of a partitioned memory.

Turning now to FIG. 3, one embodiment of a partitioned memory 300 is shown. Generational garbage collection (GC) may utilize an allocated heap 230 in memory that may be partitioned into generations 360a, 360b, 360c, and so on. In various embodiments, an operating system or other software may perform the partitioning and determine the sizes of the generations 360a, 360b, and 360c. In addition, each of generations 360a, 360b, and 360c may be partitioned into sub-regions. These sub-regions may be referred to as cards. For example, generation 360a may be partitioned into cards 350a, 350b, 350f, and so on. In one embodiment, each card 350a, 350b, and 350f has a same fixed size such as 128 bytes, a 4 kilo-byte (KB) virtual page, or other size.

In one embodiment, each of the cards 350a-350g in the heap 230 stores one or more data objects. For example, card 350a stores data objects 320a, 320g, and so on. Although a card may store only a single data object, generally, a card stores multiple data objects. Card root addresses 380a, 380b, and 380f may be used to locate corresponding cards 350a, 350b, and 350f. Metadata corresponding to the generations and cards may be stored in memory. This metadata may include generation base addresses 370a, 370b, and 370c, which are used to locate generations 360a, 360b, and 360c. In addition, this metadata may include a data structure, such as card table 310, comprising entries 312a, 312b, 312j, 312k, and so on. In one embodiment, the card table 310 may comprise one entry for each card in memory. In another embodiment, the card table 310 may comprise one entry for each card within each generation, except for a youngest generation. In such an embodiment, the youngest generation may be skipped since each card within a youngest generation may be unconditionally scanned during a GC algorithm. In another embodiment, the card table 310 may comprise one entry for each data object in the heap. Such an embodiment causes the card table 310 to substantially grow.

In one embodiment, each of entries 312a, 312b, 312j, and 312k comprises a single bit. A single bit within each of entries 312a, 312b, 312j, and 312k may be set by processor core 112 when it is executing a software application. In one embodiment, such a single bit may be set when a corresponding data object stored in a corresponding card is modified. In another embodiment, such a single bit may be set when a pointer value within a corresponding data object is modified to point to a data object stored in another generation. For example, if a pointer value within data object 320g is modified to point to a data object stored in card 350g of generation 360b, then the corresponding single bit in entry 312a may be set. In yet another embodiment, such a single bit may be set when a pointer value within a data object is modified to point to a data object stored in a youngest generation. In yet another embodiment, such a single bit may be set when a pointer value within a data object is modified to point to a data object stored in one of multiple youngest generations predetermined to be collected during the next execution of the GC algorithm. Other conditions for marking an indication within the card table 310 are possible and are contemplated.

A store check operation performs the steps above to determine whether or not to mark an indication. A store check operation may also be referred to as a write barrier operation. A store check operation may determine whether to set a corresponding single bit at a time a store operation accesses the heap during application execution. The store operation may create a pointer value to be later used during a GC algorithm. For some store operations, the compiler may know statically that no store check is necessary. For example, no store check operation may be needed when an application stores an integer and integers are implemented as immediate values rather than as heap-allocated objects. However, in the general case, a store check operation may be executed for each store operation that accesses the heap. Since stores may occur frequently in an application, an efficient implementation of the store check operation may be essential.

The operating system or other software corresponding to a processor core 112 may be configured to detect a GC start condition. In one embodiment, a GC start condition comprises a condition in which a youngest card has less free space than a predetermined threshold. In another embodiment, a GC start condition comprises a condition in which a youngest generation has less free space than a predetermined threshold. In yet another embodiment, a GC start condition comprises a condition in which the entire heap has less free space than a predetermined threshold. Other conditions are possible and contemplated. When the GC start condition is detected, the card table 310 may be scanned for marked indications, or set bits. For each set bit, a card root address may be computed.

In order to compute a card root address, in one embodiment, the position of a corresponding entry in the card table 310 may be used. The size of a card may be multiplied by the entry position of a corresponding set bit within card table 310. The resulting product may be added to a generation base address to determine the card root address. For example, a card may have a size of 128 bytes. Entry 312$j$ in card table 310 may store a set bit. Entry 312$j$ may be the 20$^{th}$ bit in card table 310. A binary value of 20 (e.g., b10100) may be shifted to the left by 7 positions. A shift of 7 positions is chosen since a card has a size of 128 bytes, or $2^7$ bytes aligned on a $2^7$-byte boundary. The resulting product may be added to the generation base address 370$a$.

The above operations for determining a card root address 380 is an operation that may be parallelized. Consequently, it may be advantageous to utilize a processor with a parallel architecture, such as a single instruction multiple data (SIMD) core. Examples of SIMD cores include graphics processing units (GPUs) and digital signal processing (DSP) cores. In one embodiment, when a processor core 112 detects a GC start condition, the core 112 may send a notification to a SIMD core 172. In one embodiment, the notification may comprise an address in memory corresponding to the location of the card table 310 and the base addresses of one or more generations. The processor core 112 may continue execution of one or more software applications as the SIMD core 172 computes the card root addresses, thereby decreasing a GC pause time.

The core 172 within a CPU, GPU, DSP, or otherwise, may concurrently compute two or more card root addresses based on both the marked indications within the card table 310 and the generation base addresses. In one embodiment, the core 172 may directly send the computed card root addresses to the processor core 112. In another embodiment, the core 172 may send an address in memory to the processor core 112, the address corresponding to a location storing the computed card root addresses. When the processor core 112 gains access to the card root address values, the processor core 112 may begin executing the steps of a predetermined GC algorithm. For example, the processor core 112 may scan each data object within a modified or dirty card corresponding to a computed card root address. The processor core 112 may trace pointer values within these data objects as described earlier to determine reachable data objects in at least a youngest generation.

Figure 4:
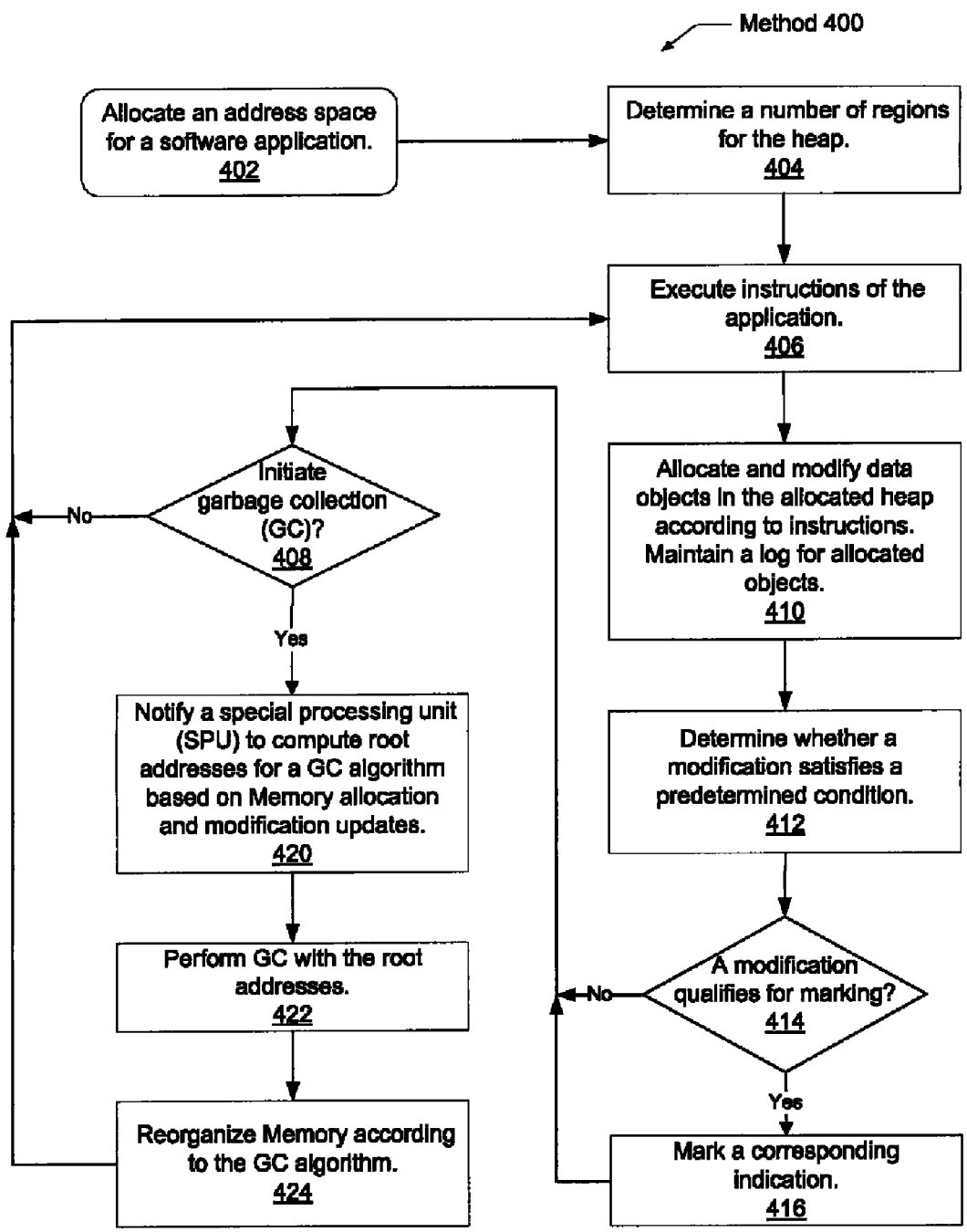
FIG. 4 is a flow diagram of one embodiment of a method for efficient garbage collection with a special processing unit with a parallel architecture.

Turning now to FIG. 4, one embodiment of a method 400 for performing garbage collection with a separate special processing core is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 402, an operating system or other software may allocate an address space for a software application. In block 404, an allocated heap may be partitioned into two or more generations. In one embodiment, the generations correspond to an age of corresponding data objects. In addition, each generation may be partitioned into sub-regions, or cards.

In block 406, instructions of one or more software applications are being executed. In block 410, during execution, data objects may be allocated in the heap. A log may be maintained in memory storing corresponding information of each allocated data object. For example, the log may include an entry for each allocated data object, wherein the entry comprises the data object name, address, size, and other. In one embodiment, a general-purpose processor executing the software applications may maintain the log. In addition, during execution, values stored within allocated data objects may be modified.

In block 412, it may be determined during execution whether a modification to an allocated data object satisfies a predetermined condition. In one embodiment, a predetermined condition may include a pointer value stored within a data object of an older generation is modified to point to a data object stored in a youngest generation. In such an embodiment, a comparison may be performed between the new pointer value and predetermined address ranges. The address ranges may correspond to the generations, such as generations 360$a$, 360$b$, and 360$c$ shown in FIG. 3. In one embodiment, this comparison may be performed for each store operation to the heap during the execution of a software application. This comparison may be a part of a store check operation. Other predetermined conditions, such as those described above regarding card marking, are possible and are contemplated.

If a modification to an allocated data object satisfies a predetermined condition (conditional block 414), then in block 416 the marking is performed. In one embodiment, a store check operation performs a determination of whether a modification to a data object within the heap qualifies for marking. The store check operation may use at least comparisons between a new pointer value and address ranges of each generation in the heap. In one embodiment, the marking of the corresponding indication comprises setting a corresponding bit in a data structure such as a card table 310. In one embodiment, the store check operation may also use comparisons between the new pointer value and address ranges of each card in the heap. These comparisons may be performed simultaneously with the comparisons to address ranges of generations.

In conditional block 408, a determination may be made as to whether to initiate garbage collection. Different requirements may be used to determine when to begin this garbage collection—such as the amount of free memory available (e.g., compared to some threshold), the amount of free memory available within a youngest generation, a given amount of time has elapsed since a last garbage collection, or otherwise. If it is determined that garbage collection is not to be initiated (conditional block 408), then control flow of method 400 returns to block 406. In block 406, the execution of instructions of the application continues. If it is determined that garbage collection is to be initiated (conditional block 408), then in block 420 a notification may be sent to a special processing unit (SPU). The notification may indicate that the SPU begins computing card root addresses, such as addresses 380$a$, 380$b$, and 380$f$ shown in FIG. 3. The computation of the card root addresses may be based on the memory allocation and modification updates performed during application execution since the last garbage collection. For example, one card root address may be computed for each marked indication that occurred in block 416. In one embodiment, a marked indication corresponds to a set bit within a card table 310.

In block 422, the SPU may perform the computations to determine the card root addresses. In one embodiment, the computations may include a shift and an add operation to a corresponding base address as previously described. Later, the SPU may send the card root addresses to the CPU. Alternatively, the SPU may send to the CPU an address corresponding to a location in memory that stores the card root addresses. In block 424, the CPU may perform the steps of a GC algorithm utilizing the computed card root addresses.

Figure 5:
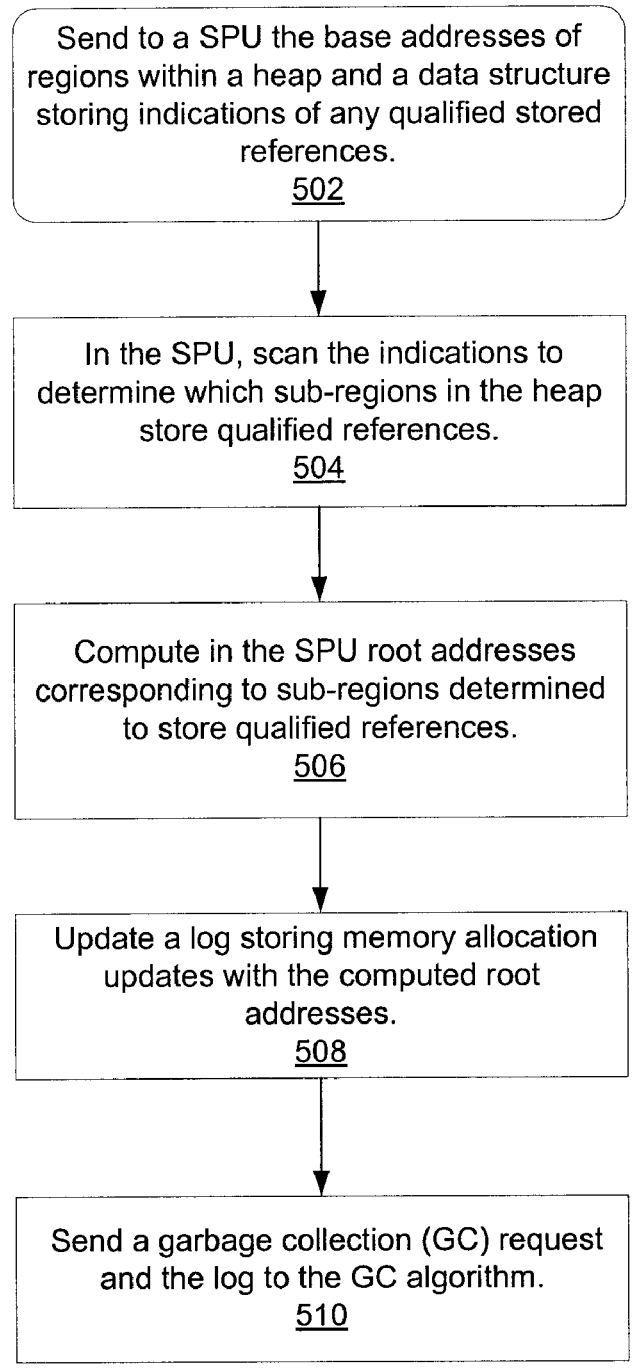
FIG. 5 is a flow diagram of one embodiment of a method for computing card root addresses to be used in a garbage collection algorithm.

Referring now to FIG. 5, one embodiment of a method 500 for computing card root addresses to be used in a garbage collection algorithm is shown. Similar to method 400, for purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 502, a notification may be sent from a CPU to an SPU to compute card root addresses for a GC algorithm. In one embodiment, the CPU may send to the SPU one or more generation base addresses, such as generation base addresses 370a, 370b, and 370c shown in FIG. 3. In addition, the CPU may send to the SPU an address of a data structure, such as card table 310. This data structure may store indications of any qualified stored references during application execution since the last garbage collection. In block 504, the SPU may utilize the parallel architecture of its SIMD core to scan the stored indications in the data structure, such as card table 310. This scanning operation may determine which sub-regions, or cards, in the heap store qualified cross-generation references. In block 506, the SPU may utilize the parallel architecture of its SIMD core to simultaneously compute multiple card root addresses. These computations may be performed without any halt in execution of software applications by the CPU. Therefore, the card root addresses may be determined without a garbage collection pause time.

In block 508, the CPU may receive the card root addresses from the SPU. Alternatively, the CPU may receive one or more addresses corresponding to locations in memory storing the card root addresses. In one embodiment, the CPU updates the log created and maintained in block 410 of method 400. This log stores corresponding information of each allocated data object in the heap during application execution. This log may be updated with the computed card root addresses. In block 510, the CPU may perform the steps of a predetermined GC algorithm utilizing the information stored in the log.

Figure 6:
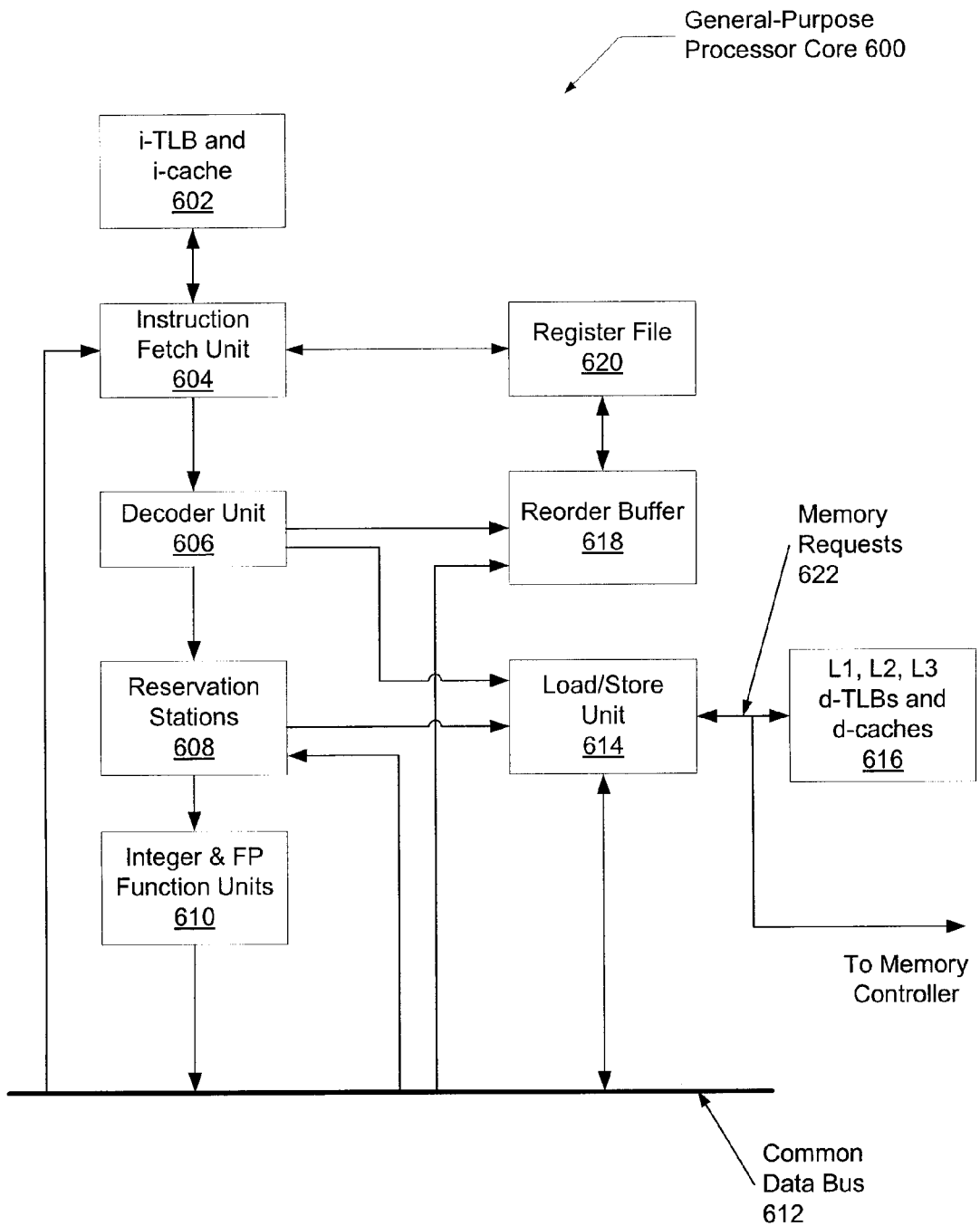
FIG. 6 is a generalized block diagram of one embodiment of a general-purpose processor core.

Above, a description is given to utilize a parallel architecture of a SIMD core to perform pre-processing steps for a garbage collection algorithm. In one embodiment, the pre-processing steps include scanning a card table and computing corresponding card root addresses. Here, a further description is given between the differences of a general-purpose core and a parallel architecture SIMD core. First, the general-purpose core is described. FIG. 6 illustrates one embodiment of a general-purpose processor core 600 that performs out-of-order execution. An instruction-cache (i-cache) and corresponding translation-lookaside-buffer (TLB) 602 may store instructions for a software application and addresses in order to access the instructions. The instruction fetch unit (IFU) 604 may fetch multiple instructions from the i-cache 602 per clock cycle if there are no i-cache misses. The IFU 604 may include a program counter that holds a pointer to an address of the next instructions to fetch in the i-cache 602, which may be compared to addresses in the i-TLB. The IFU 604 may also include a branch prediction unit to predict an outcome of a conditional instruction prior to an execution unit determining the actual outcome in a later pipeline stage.

The decoder unit 606 decodes the opcodes of the multiple fetched instructions and may allocate entries in an in-order retirement queue, such as reorder buffer 618, in reservation stations 608, and in a load/store unit 614. The allocation of entries in the reservation stations 608 is considered dispatch. The reservation stations 608 may act as an instruction queue where instructions wait until their operands become available. When operands are available and hardware resources are also available, an instruction may be issued out-of-order from the reservation stations 608 to the integer and floating-point functional units 610 or to the load/store unit 614. Memory accesses such as load and store operations are issued to the load/store unit 614. The functional units 610 may include arithmetic logic units (ALUs) for computational calculations such as addition, subtraction, multiplication, division, and square root. Logic may be included to determine an outcome of a conditional instruction. The load/store unit 614 may include queues and logic to execute a memory access instruction. Also, verification logic may reside in the load/store unit 614 to ensure a load instruction receives forwarded data from the correct youngest store instruction.

The load/store unit 614 may send memory access requests 622 to the one or more levels of data cache (d-cache) 616 on the chip. Each level of cache may have its own TLB for address comparisons with the memory requests 622. Each level of cache 616 may be searched in a serial or parallel manner. If the requested memory line is not found in the caches 616, then a memory request 622 is sent to the memory controller in order to access the memory line in system memory off-chip.

Results from the functional units 610 and the load/store unit 614 may be presented on a common data bus 612. The results may be sent to the reorder buffer 618. In one embodiment, the reorder buffer 618 may be a first-in first-out (FIFO) queue that ensures in-order retirement of instructions according to program order. Here, an instruction that receives its results is marked for retirement. If the instruction is head-of-the-queue, it may have its results sent to the register file 620. The register file 620 may hold the architectural state of the general-purpose registers of processor core 600. Then the instruction in the reorder buffer may be retired in-order and its head-of-queue pointer may be adjusted to the subsequent instruction in program order.

The results on the common data bus 612 may be sent to the reservation stations 608 in order to forward values to operands of instructions waiting for the results. For example, an arithmetic instruction may have operands that depend on the results of a previous arithmetic instruction, or a load instruction may need an address calculated by an address generation unit (AGU) in the functional units 610. When these waiting instructions have values for their operands and hardware resources are available to execute the instructions, they may be issued out-of-order from the reservation stations 608 to the appropriate resources in the functional units 610 or the load/store unit 614.

Uncommitted, or non-retired, memory access instructions have entries in the load/store unit. The forwarded data value for an in-flight, or uncommitted, load instruction from the youngest uncommitted older store instruction may be placed on the common data bus 112 or simply routed to the appropriate entry in a load buffer within the load/store unit 614. It is noted that although a general-purpose processor core, such as core 600, may execute instructions of a highly parallel algorithm, such as a single instruction multiple data (SIMD) application, it may be less efficient than a special processing core with a parallel architecture such as a SIMD core. Examples of special processing cores with a parallel architecture include digital signal processors (DSPs), graphics processing units (GPUs), or other.

Figure 7:
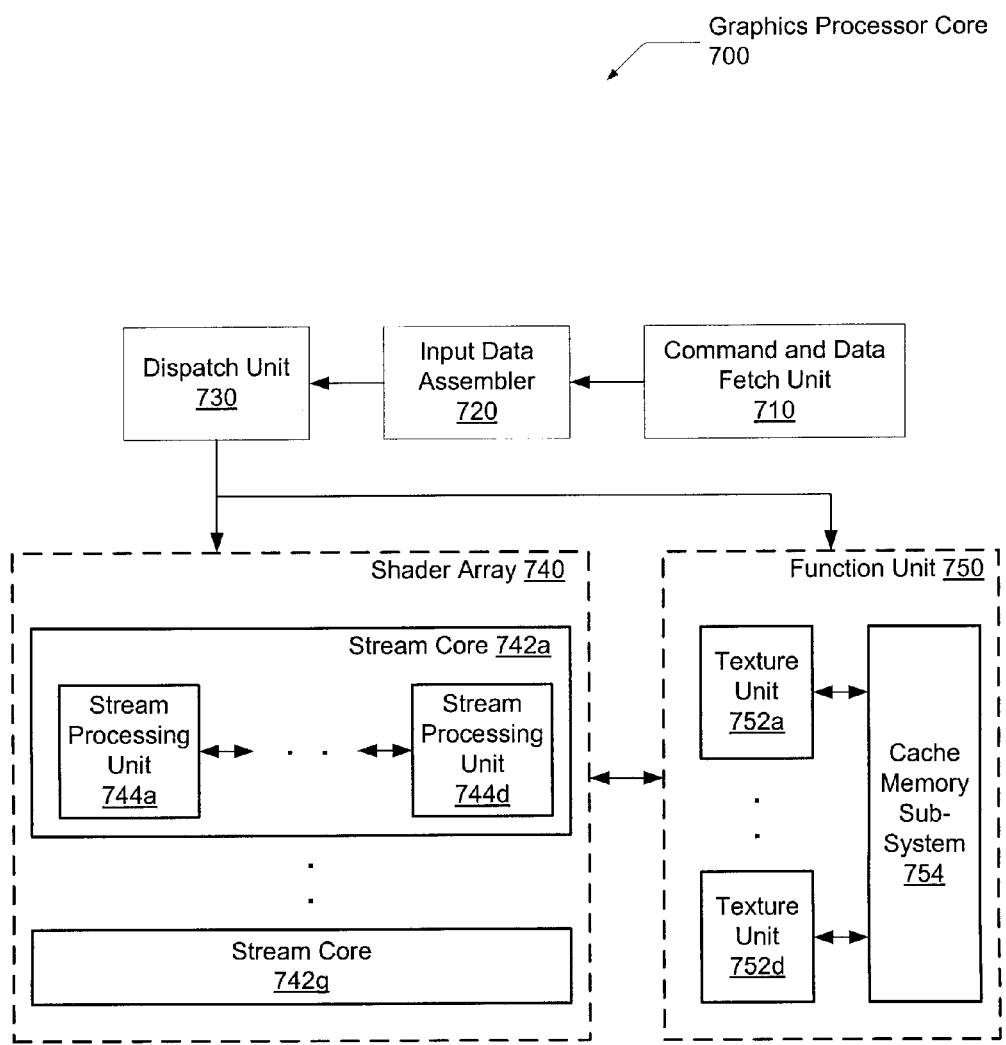
FIG. 7 is a generalized block diagram of one embodiment of a graphics processor core.

Turning now to FIG. 7, a block diagram of one embodiment of a graphics processor core 700 is shown. Core 700 is one example of a parallel architecture in a SIMD core. Other examples, such as a core for a DSP, are possible and contemplated. Core 700 may be modified by those skilled in the art in order to derive alternative embodiments. The blocks in this embodiment are shown with a particular layout. However, the layout of core 700 may differ from the one shown. In other embodiments, some blocks may be integrated, some blocks may have internal functionality and circuitry in another block or in a separate independent block, and some functionality and circuitry may be located in another integrated circuit.

In the embodiment shown, the command and data fetch unit 710 may receive a rendering command stream, state information, and geometry data for floating point operations from a graphics driver on a processor core, such as core 112 in FIG. 1. In some embodiments, rather than providing this information directly, a processor core may provide references to locations in memory, such as memory, at which this information is stored. Accordingly, unit 710 retrieves the information from the specified locations.

The rendering command stream, state information, and geometry data may be used to define the desired rendered image or images, including geometry, lighting, shading, texture, motion, and/or camera parameters for a scene. In one embodiment, the geometry data includes a number of definitions for objects (e.g., a table, a tree, a person or animal) that may be present in the scene. Groups of primitives (e.g., points, lines, triangles and/or other polygons) may be used to model objects. The primitives may be defined by a reference to their vertices. For each vertex, a position may be specified in an object coordinate system, representing the position of the vertex relative to the object being modeled. In addition to a position, each vertex may have various other attributes associated with it. Examples of other vertex attributes may include scalar or vector attributes used to determine qualities such as the color, texture, transparency, lighting, shading, and animation of the vertex and its associated geometric primitives.

Management of objects in a scene may include state management overhead and this overhead may increase if the work is grouped in small batches. In one embodiment, unit 710 may be a processor that offloads work from a graphics driver from a host CPU, such as CPU 115. Generally, the graphics driver performs the work for this management, but then the processing unit 115 is burdened with this work. Therefore, by strengthening the processing capability of unit 710, the graphics driver, and, consequently, the processing unit 115 may be relieved of overhead operations.

Next, the input data assembler 720 prepares data for processing. Three examples of functions performed by assembler 720 may include vertex assembly for vertex shaders, geometry assembly for geometry shaders, and scan conversion and interpolation for pixel shaders. Each function may submit threads to the dispatch unit 730.

In one embodiment, dispatch unit 730 may divide a received workload into threads and optimally distribute the threads among shader array 740, which includes one or more stream cores 742, and function unit 750, which includes one or more texture units 752. Dispatch unit 730 may determine the moments of idleness of some stream processing units 744 within the cores 742 and assign them new tasks.

Stream processing applications are characterized by the need to process high-volume data streams in a timely and responsive fashion. Such applications can use multiple computational units, such as the floating-point units on a GPU, without explicitly managing allocation, synchronization, or communication among those units. Stream processing may simplify parallel software and hardware by restricting the parallel computation that can be performed. A stream, which is a given a set of data, may have a series of operations applied to each element in the stream. Uniform streaming, where one operation is applied to all elements in the stream, is typical. Operations are usually pipelined, and local on-chip memory is reused to minimize external memory bandwidth.

The stream abstractions expose data dependencies, and, therefore, compiler tools can fully automate and optimize on-chip management tasks. Stream processing hardware can use scoreboarding, for example, to launch direct memory accesses (DMAs) at runtime, when dependencies become known. The elimination of manual DMA management reduces software complexity, and the elimination of hardware caches reduces the amount of die area not dedicated to computational units such as arithmetic logic units (ALUs).

Stream processing is driven by a data-centric model that works well for traditional digital signal processing (DSP) or GPU-type applications. Stream processing is not optimal for general-purpose processing with more randomized data accesses, such as databases.

In one embodiment, each stream core 742 is a SIMD core and includes multiple stream processing units (SPU) 744. Each SPU 744 may include multiple ALUs, and, therefore, shader array 740 may have a large amount of computing power. Shader array 740 may execute vertex and/or geometry shader programs on vertex data, with the programs being selected by the provided state information. Shader programs can implement algorithms using a wide range of mathematical and logical operations on vertices and other data, and the programs can include conditional or branching execution paths and direct and indirect memory accesses. A shader program to be used may be stored in system memory or buffers 174 shown in FIG. 1. A shader program may be identified to shader array 740 via suitable rendering commands and state information as is known in the art.

Function unit 750 includes one or more texture units 752 for execution of pixel shader programs for visual effects. In one embodiment, the texture units 752 are aligned with stream cores 742, so that adding more shader power equates to adding more texturing power. Texture units 752 may utilize a cache memory subsystem 754 for data storage during program execution.

Figure 8:
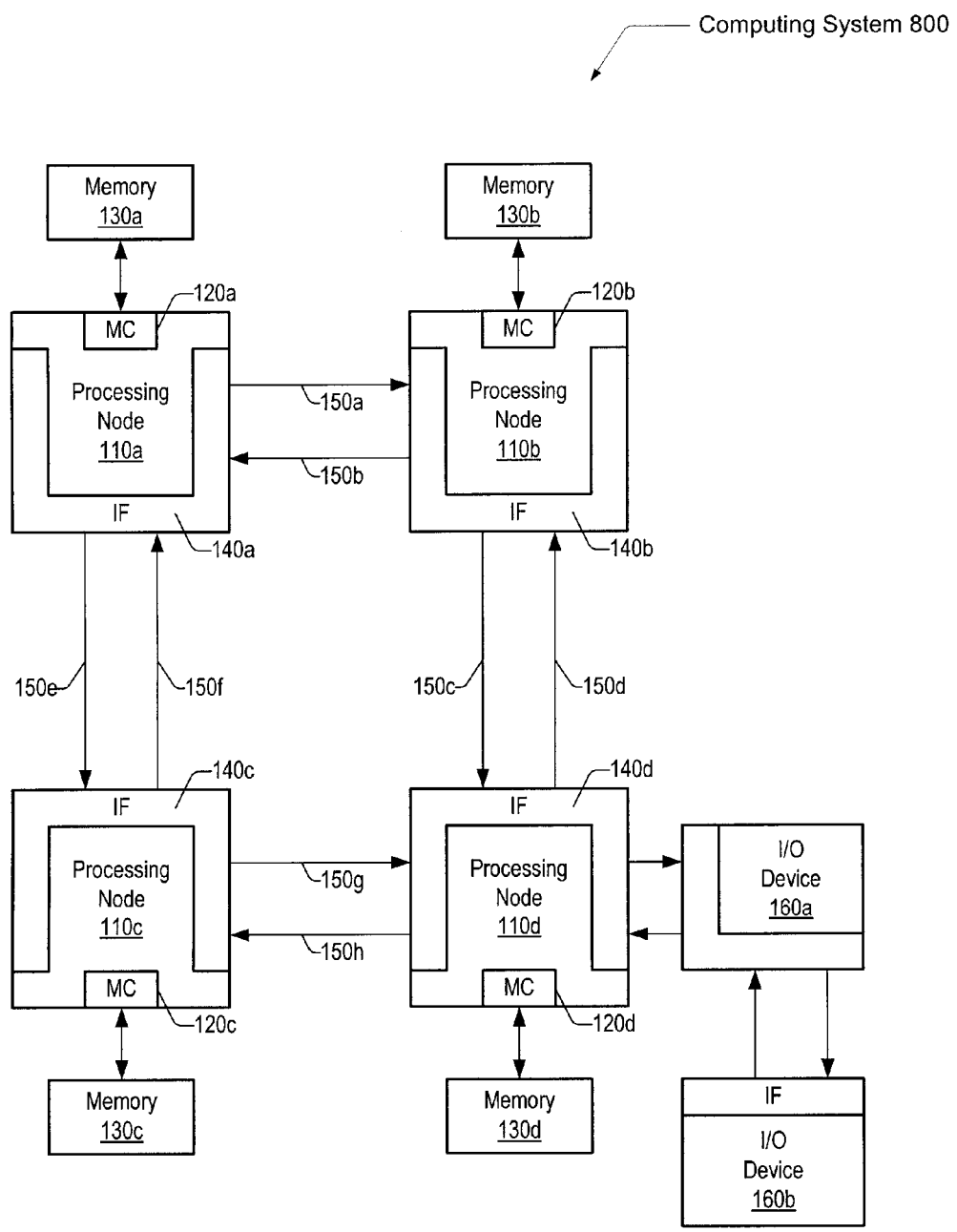
FIG. 8 is a generalized block diagram illustrating one embodiment of a computing system.

Referring to FIG. 8, one embodiment of a computing system 800 is shown. Circuit portions that correspond to those of FIG. 1 are numbered identically. Computing system 800 includes a plurality of processing nodes 110a-110d. Although four nodes are shown in FIG. 8, other embodiments may comprise a different number of nodes each comprising one or more processor cores. As used herein, elements referred to by a reference numeral followed by a letter may be collectively referred to by the numeral alone. For example, processing nodes 110a-110d may be collectively referred to as processing nodes 110, or nodes 110. Each node 110 may be coupled to a respective memory 130 via a respective memory controller 120. Additionally, each processing node 110 may include interface logic 140 used to communicate with others of the processing nodes 110. For example, processing node 110*a* includes interface logic 140*a* for communicating with processing nodes 110*b* and 110*c*. Similarly, processing node 110*b* includes interface logic 140*b* for communicating with processing nodes 110*a* and 110*d*, and so on.

In the embodiment of FIG. 8, processing node 110*d* is shown coupled to communicate with an input/output (I/O) device 160*a* via interface logic 140*d*, and I/O device 160*a* is further coupled to a second I/O device 160*b*. Other processing nodes may communicate with other I/O devices in a similar fashion. Alternatively, a processing node may communicate with an I/O bridge, which is coupled to an I/O bus.

Computing system 800 may implement a packet-based link for inter-node communication. In the depicted embodiment, the link is implemented as sets of unidirectional lines (e.g. lines 150*a* are used to transmit packets from processing node 110*a* to processing node 110*b* and lines 150*b* are used to transmit packets from processing node 110*b* to processing node 110*a*). Other sets of lines 150*c*-150*h* are used to transmit packets between other processing nodes as illustrated in FIG. 8. The link may be operated in a cache coherent fashion for communication between processing nodes or in a noncoherent fashion as a daisy-chain structure between I/O devices 160*a*-160*b* (and additional I/O devices, as desired). It is noted that a packet to be transmitted from one processing node 110 to another may pass through one or more intermediate nodes. For example, a packet transmitted by processing node 110*a* to processing node 110*d* may pass through either processing node 110*b* or processing node 110*c* as shown in FIG. 8. Any suitable routing algorithm may be used. Other embodiments of computing system 800 may include more or fewer processing nodes than the embodiment shown in FIG. 8. In addition, other embodiments are possible in which each processing node is coupled to every other processing node through a point-to-point network. In addition to the depicted memory controller and interface logic, each processing node 110 may include one or more processors and associated caches, as shown and described earlier in FIG. 1.

Memories 130 may comprise any suitable memory devices. For example, a memory 130 may comprise one or more RAMBUS dynamic random access memories (DRAMs), synchronous DRAMs (SDRAMs), DRAM, static RAM, etc. The address space of computing system 800 is divided among memories 130. Each processing node 110 may include a memory map used to determine which addresses are mapped to which memories 130, and hence to which processing node 110 a memory request for a particular address should be routed. In one embodiment, the coherency point for an address within computing system 800 is the memory controller 120 coupled to the memory storing bytes corresponding to the address. Memory controllers 120 may comprise control circuitry for interfacing to memories 130. Additionally, memory controllers 120 may include request queues for queuing memory requests.

Generally, interface logic 140 may comprise buffers for receiving packets from the link and for buffering packets to be transmitted upon the link. Computing system 800 may employ any suitable flow control mechanism for transmitting packets. I/O devices 160 are illustrative of any desired peripheral devices. For example, I/O devices 160 may comprise network interface cards, video accelerators, audio cards, hard or floppy disk drives or drive controllers, Small Computer Systems Interface (SCSI) adapters and telephony cards, modems, sound cards, and a variety of data acquisition cards such as General Purpose Interface Bus (GPIB) or field bus interface cards.

As stated earlier, each processing node 110 may include one or more processors and associated caches, as shown and described earlier in FIG. 1. Each node 110 may comprise one or more general-purpose processor cores 112. In addition, a processing node 110 may comprise a special processor core 172 with a parallel architecture, such as a single instruction multiple data (SIMD) core. The processor core 112 may utilize the SIMD core 172 to compute root addresses prior to executing the steps of a GC algorithm as described earlier. Alternatively, a processor core 112 in processing node 110*a*, for example, without a SIMD core 172 may utilize a SIMD core 172 in a separate node, such as node 110*b*, that does comprise a SIMD core 172. In such an embodiment, when the processor core 112 within node 110*a* detects a satisfied GC start condition, the core 112 may send a notification to compute root addresses to the SIMD core 172 within the separate node 110*b*. The notification may be included in any chosen inter-node communication.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing node comprising:
a general-purpose central processing unit (CPU);
a special processing unit (SPU); and
a memory;
wherein the CPU is configured to:
store an indication corresponding to a portion of the memory, in response to detecting a data object stored in the portion has been modified; and
send a notification to the SPU responsive to detecting a garbage collection start condition is satisfied, the notification including the stored indication and base address of a region of the memory corresponding to the portion;
wherein in response to receiving the notification from the CPU, the SPU is configured to compute a plurality of root addresses, each root address corresponding to a stored indication, and send the computed root addresses to the CPU to be used by a garbage collection algorithm to identify reachable data objects in one or more predetermined collectable regions, wherein the one or more predetermined collectable regions are youngest regions of the plurality of regions.

2. The processing node as recited in claim 1,
wherein the CPU is further configured to:
divide the memory into a plurality of regions, each region comprising a plurality of sub-regions, said portion corresponding to one of said sub-regions.

3. The processing node as recited in claim 1, wherein the CPU is further configured to store an indication corresponding to a sub-region of the plurality of sub-regions responsive to detecting a data object stored in the sub-region comprises a pointer value that points to one of the one or more predetermined collectable regions.

4. The processing node as recited in claim 1, wherein the SPU is further configured to:
   read in parallel two or more stored indications to locate two or more corresponding sub-regions; and
   compute in parallel, for each of the two or more located sub-regions, one root address based on a corresponding base address.

5. The processing node as recited in claim 4, wherein the SPU comprises a single instruction multiple data (SIMD) parallel architecture.

6. The processing node as recited in claim 4, wherein the SPU computes said plurality of root addresses without a pause that halts execution of the CPU.

7. A method for garbage collection, the method comprising:
   a general-purpose central processing unit (CPU) storing an indication corresponding to a portion of a memory, in response to detecting a data object stored in the portion has been modified;
   sending a notification from the CPU to a special processing unit (SPU) responsive to detecting a garbage collection start condition is satisfied, the notification including the stored indication and base address of a region of the memory corresponding to the portion; and
   the SPU computing a plurality of root addresses, each root address corresponding to a stored indication, and the SPU sending the computed root addresses to the CPU to be used by a garbage collection algorithm to identify reachable data objects in one or more predetermined collectable regions, wherein the one or more predetermined collectable regions are youngest regions of the plurality of regions.

8. The method as recited in claim 7, further comprising:
   the CPU dividing the memory into a plurality of regions, each region comprising a plurality of sub-regions, said portion corresponding to one of said sub-regions.

9. The method as recited in claim 8, further comprising storing an indication corresponding to a sub-region of the plurality of sub-regions responsive to detecting a data object stored in the sub-region comprises a pointer value that points to one of the one or more predetermined collectable regions.

10. The method as recited in claim 7, further comprising:
    reading in parallel two or more stored indications to locate two or more corresponding sub-regions; and
    computing in parallel, for each of the two or more located sub-regions, one root address based on a corresponding base address.

11. The method as recited in claim 7, wherein the garbage collection start condition comprises a condition wherein a youngest sub-region has less free space than a predetermined threshold.

12. A computing system comprising:
    a first processing node comprising a general purpose central processing unit (CPU);
    a memory coupled to the first processing node; and
    a second processing node comprising a special processing unit (SPU);
    wherein the CPU is configured to:
       store an indication corresponding to a portion of the memory, in response to detecting a data object stored in the portion has been modified; and
       send a notification to the SPU responsive to detecting a garbage collection start condition is satisfied, the notification including the stored indication and base address of a region of the memory corresponding to the portion;
    wherein in response to receiving the notification from the CPU, the SPU is configured to compute a plurality of root addresses, each root address corresponding to a stored indication, and send the computed root addresses to the CPU to be used by a garbage collection algorithm to identify reachable data objects in one or more predetermined collectable regions, wherein the one or more predetermined collectable regions are youngest regions of the plurality of regions.

13. The computing system as recited in claim 12, wherein the CPU is further configured to:
    divide the memory into a plurality of regions, each region comprising a plurality of sub-regions, said portion corresponding to one of said sub-regions.

14. The computing system as recited in claim 13, wherein the CPU is further configured to store an indication corresponding to a sub-region of the plurality of sub-regions responsive to detecting a data object stored in the sub-region comprises a pointer value that points to one of the one or more predetermined collectable regions.

* * * * *